UNITED STATES PATENT OFFICE 2,400,075

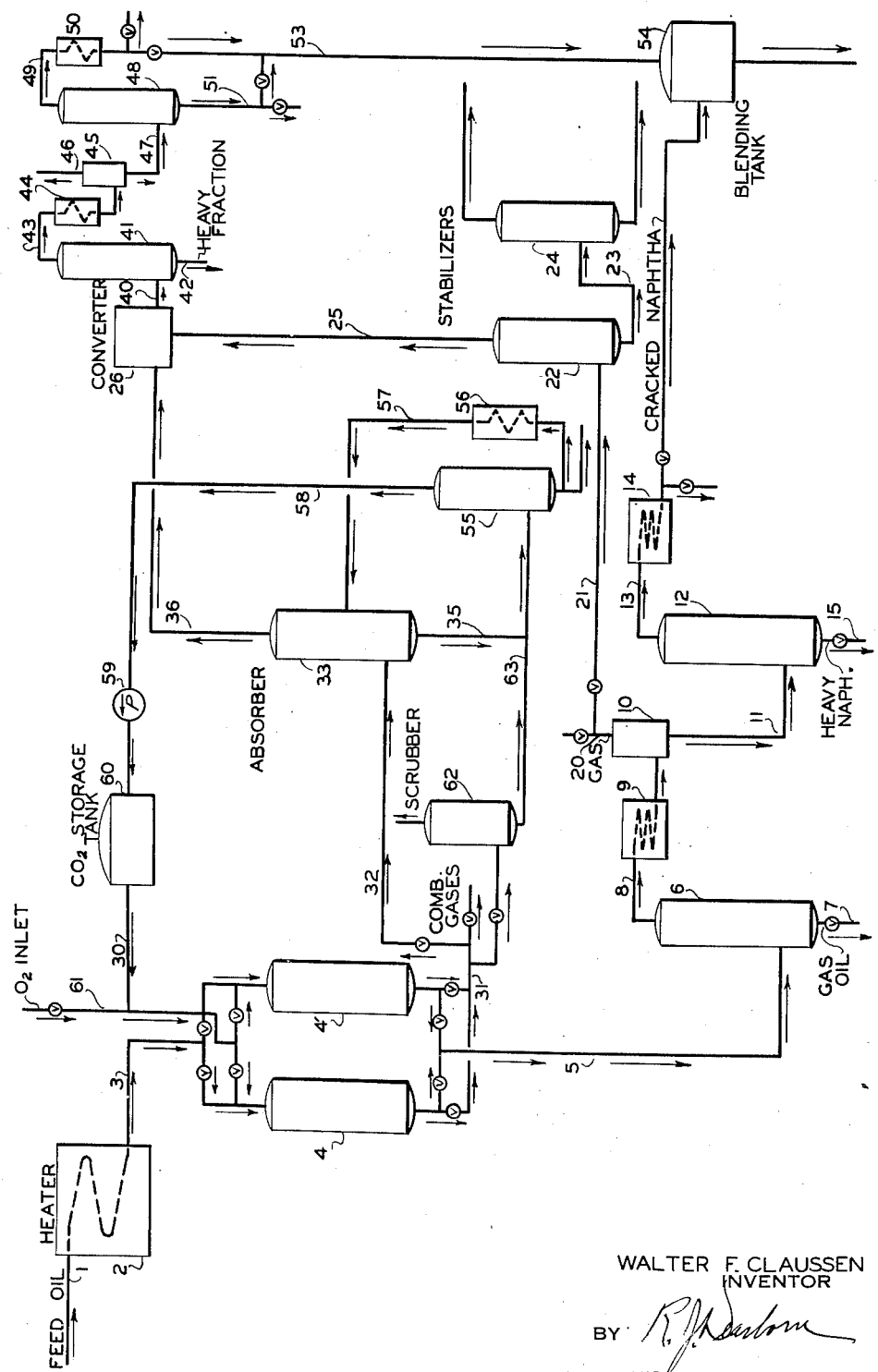

MANUFACTURE OF GASOLINE HYDROCARBONS

Walter F. Claussen, Poughkeepsie, N. Y., assignor to The Texas Company, New York, N. Y., a corporation of Delaware Application April 14, 1943, Serial No. 482,975

3 Claims. (Cl. 196—52)

This invention relates to the manufacture of gasoline hydrocarbons by a process which involves catalytic cracking of hydrocarbon oil to form gasoline hydrocarbons, gas including normally gaseous hydrocarbons and carbonaceous material deposited upon the catalyst; and also involves catalytic conversion of gaseous materials produced in the catalytic cracking operation to form synthetic hydrocarbons including hydrocarbons boiling within the range for gasoline. The gasoline hydrocarbons produced by the synthesis and by the catalytic cracking operation may be blended or otherwise used in the manufacture of motor fuel.

In accordance with the invention, hydrocarbon oil is catalytically cracked to produce gasoline hydrocarbons and also gaseous materials including hydrogen and normally gaseous hydrocarbons such as methane. The used catalyst having carbonaceous material deposited thereon is regenerated by treating with carbon dioxide under conditions such that carbon dioxide is converted to carbon monoxide and the carbonaceous material is burned from the catalyst.

The regenerated catalyst is re-employed in the cracking of fresh feed oil while the carbon monoxide produced in the regeneration action is passed to a synthesis reaction wherein it is reacted with hydrogen derived from the catalytic cracking operation to produce synthetic hydrocarbons.

More specifically the invention involves employing a catalyst in the cracking reaction which upon regeneration by treatment with carbon dioxide converts the carbon dioxide into carbon monoxide, the resulting carbon monoxide being utilized for reaction with hydrogen to form synthetic hydrocarbons by what is known as the Fischer-Tropsch process.

An advantage of regenerating the cracking catalyst in this manner is that the reaction between carbon and carbon dioxide wherein the carbon dioxide is reduced to the monoxide is an endothermic reaction. In the conventional regeneration method which involves reaction between carbon and oxygen to form carbon dioxide the reaction is exothermic so that a large amount of heat is liberated during the regeneration of the catalyst, necessitating special provision for removing this heat so as to avoid overheating of the catalyst.

Accordingly, by employing a procedure of regeneration which involves an endothermic reaction the temperature of the catalyst during the regeneration can be more closely controlled.

A further advantage is that the resulting carbon monoxide can be used to react with hydrogen derived from the catalytic cracking reaction so as to produce additional products useful in the manufacture of gasoline.

It has been found that a cracking catalyst containing nickel or having nickel deposited thereon is effective in promoting the reaction between carbon and carbon dioxide whereby the dioxide is reduced to the monoxide.

Thus the cracking catalyst may comprise an alumina-silica gel impregnated with nickel or having nickel deposited thereon. The alumina-silica gel may be a naturally occurring or a synthetically produced material. Acid-treated Doucil containing nickel has been found effective, for example. Doucil is synthetic gel having the approximate composition $Na_2O$, $Al_2O_3$, $5SiO_2$. A synthetic gel type of catalyst containing about 2% alumina, 90% silica and about 8% zirconia impregnated with nickel is contemplated as an effective catalyst.

It is desirable that the catalytic material be substantially free from alkali and alkaline earth metals and that it be stable at temperatures as high as about 1400° F.

The regeneration is advantageously effected at a temperature in the range 1000 to 1200° F. and the reaction between carbon and carbon dioxide is promoted by the presence of nickel or other effective promoting agent contained in the cracking catalyst.

In order to describe the invention in more detail reference will now be made to the accompanying drawing comprising a flow diagram illustrating one mode of operation.

Referring to the drawing a feed oil such as a gas oil derived from Mid-Continent crude is conducted from a source not shown through a pipe 1 and passed through a heater 2 wherein it is vaporized and heated to a temperature ranging from about 850 to 1050° F.

The resulting hot vapors are conducted through a pipe 3 to one of a plurality of reactors 4 and 4'. A plurality of reactors is advantageously employed when a fixed catalyst bed type of operation is used so that while one contact mass is onstream an adjoining mass may be offstream undergoing regeneration.

It is, of course, contemplated that instead of a fixed bed type of operation other types of catalytic cracking procedures may be employed such as the fluidized catalyst type wherein a powdered catalyst is continuously moved through a reaction zone, the used catalyst being continuously drawn off, regenerated and recycled to the reaction zone.

The contact mass in the fixed bed reactor is maintained at the desired cracking temperature so that during passage therethrough the hot vaporized oil undergoes conversion into gas, gasoline hydrocarbons, higher boiling hydrocarbons and some carbon, the latter being deposited upon the catalyst.

Thus, as indicated in the drawing the previously mentioned pipe 3 communicates with a pipe manifold through which the vapors may be diverted through either one of the reactors. The effluent hydrocarbon mixture containing cracked hydrocarbons is drawn off from the onstream reactor through a manifold which affords communication with a transfer pipe 5 leading to a fractionator 6.

The cracked products are subjected to fractionation in the fractionator 6 to separate as a liquid fraction hydrocarbon material higher boiling than naphtha. This high boiling fraction is drawn off through a pipe 7.

The distillate fraction comprising naphtha hydrocarbons and normally gaseous constituents is continuously drawn off through a pipe 8 and cooler and condenser 9 and from there to an accumulating drum 10.

In the drum 10 normally gaseous constituents separate from the liquid condensate and the separated gas will comprise hydrogen and normally gaseous hydrocarbons such as methane, ethane, propane, butanes, etc.

The condensate comprising gasoline hydrocarbons is drawn off through a pipe 11 to a fractionator 12 wherein it may be fractionated into any desired fractions, for example, light and heavy fractions. The light fraction is continuously drawn off as a distillate through a pipe 13 and condenser 14. The heavy fraction is discharged from the bottom of the fractionator through a pipe 15.

The gas fraction previously referred to is drawn off from the top of the drum 10 through a pipe 20 and all or in part conducted through a branch pipe 21 to a stabilizer 22. The stabilizer may be operated so as to separate a liquid fraction comprising $C_2$, $C_3$ and $C_4$ hydrocarbons and this liquid fraction may be drawn off through a pipe 23 to another stabilizer 24 wherein further separation may be effected between $C_2$, $C_3$ and $C_4$ hydrocarbons.

The gas fraction overhead from the stabilizer 22 will thus consist essentially of hydrogen and methane.

It is contemplated that instead of passing directly to stabilizers, the drum gas from the drum 10 may be passed through an absorption tower so as to absorb the normally gaseous hydrocarbons and leave a lean gas consisting largely of hydrogen.

The hydrogen or hydrogen-containing gas is conducted from the stabilizer 22 through a pipe 25 to a converter 26 to which reference will be made later.

Referring now to the catalytic cracking reaction when a contact mass has been onstream for a period of several hours, as, for example, 3 or 4 hours, a substantial amount of carbonaceous material is deposited thereon, necessitating regeneration of the contact mass in order to restore its cracking activity. At this time the feed vapor stream is diverted to an adjoining reactor while the reactor now offstream is subjected to regeneration.

During regeneration carbon dioxide from a storage tank 60 is conducted through a pipe 30 to the previously mentioned manifold through which it is passed to the offstream reactor. The carbon dioxide gas is advantageously preheated to a temperature of about 1200 to 1300° F. prior to introduction to the contact mass.

Carbon dioxide used for regeneration of the cracking catalyst may be obtained from flue gas by absorption, as, for example, by absorption in sodium or potassium carbonate solution from which the carbon dioxide can be released by heating.

The hot carbon dioxide gas is passed through the contact mass at a gas space velocity in the range about 10 to 1000 volumes of gas, measured at 60° F., per volume of catalyst per hour for a period which may range from about 1 to 4 hours or may be confined to a relatively short period ranging from 10 to 60 minutes.

The effluent gas is removed through the exit manifold communicating with a pipe 31.

It will be understood that the reactor may be purged prior to regeneration so that the effluent gas initially leaving the reactor may be separately discharged. Since the purged gas may contain substantial amounts of hydrocarbons it, therefore, may be passed directly to the fractionator 6 or to some other apparatus for recovery of entrained hydrocarbons.

Once the regeneration is underway the effluent gas rich in carbon monoxide may be passed all or in part through branch pipe 32 to an absorber 33 wherein its content of carbon dioxide may be removed by absorption in a suitable menstruum such as a solution of potassium carbonate, $K_2CO_3$, introduced through a pipe 57.

The enriched carbonate solution comprising potassium bicarbonate as a result of reaction with $CO_2$ contained in the gas is drawn off through a pipe 35. The withdrawn solution may be subjected to heating in a vessel 55 in order to liberate carbon dioxide and restore the solution to the form of the carbonate following which the restored solution is recycled through a cooler 56 and pipe 57 to the absorber.

The liberated carbon dioxide may be passed through a pipe 58 and compressor 59 to the storage tank 60 and from which source it may be returned to the regenerating system.

The scrubbed gas rich in carbon monoxide leaves the scrubber through a pipe 36 through which it is conducted to the previously mentioned converter 26.

In the converter 26 the carbon monoxide is reacted with hydrogen in accordance with the Fischer-Tropsch reaction. Thus, the carbon monoxide and hydrogen are usually charged in the proportion of about 1 mol of carbon monoxide to from 1 to 2 mols of hydrogen. The mixture of carbon monoxide and hydrogen is passed over a suitable catalyst which may comprise one or more metals of the iron group, preferably nickel, cobalt or iron in intimate mixture with a difficultly reducible oxide of the group alumina, thoria, zirconia, chromium oxide. The reaction is effected at a temperature in the range about 375 to 425° F.

If desired the carbon monoxide and the hydrogen-containing gas passing to the converter 26 may be scrubbed to remove sulfur compounds which would poison the catalyst. Suitable scrubbing agents for this purpose comprise sodium phenolate, triethanolamine, diamino-isopropyl.

The resulting reaction mixture comprising both normally gaseous and normally liquid hydrocarbons is passed through a pipe 40 to a fractionator 41. In the fractionator 41 hydrocarbons boiling above the range for gasoline or naphtha are separated as a liquid fraction which is drawn off through a pipe 42. The distillate from the fractionator 41 comprising gasoline hydrocarbons and gaseous material is drawn off through a pipe 43 and cooler 44 to a drum 45. The gaseous constituents are discharged through a pipe 46 and may be separately treated for the purpose of separating constituents which it is desired to recycle to the converter 26.

The liquefied gasoline hydrocarbons are drawn off through a pipe 47 to a fractionator 48 wherein they may be fractionated into any desired fraction such as light and heavy naphtha fractions. The light fraction is drawn off through a pipe 49 and cooler 50 while a heavy fraction is drawn off through a pipe 51.

Either or both of the fractions discharged from the fractionator 48 may be conducted through a pipe 53 to a blending tank 54 wherein the synthetic naphtha is blended with cracked naphtha discharged from the fractionator 12.

A cracking catalyst containing nickel such as described above exerts a dehydrogenating action during the cracking step so that normally gaseous constituents produced from the cracking reaction contain substantial amounts of uncombined hydrogen. If desired additional hydrogen may be derived from methane or other normally gaseous hydrocarbons produced in the cracking reaction. Thus, methane may be reacted with carbon dioxide at a temperature of about 2000° F. in the presence of a catalyst comprising nickel deposited on clay of high alumina content such as fire clay or alundum thereby producing gas rich in hydrogen and carbon monoxide.

As already described the invention contemplates an active cracking catalyst containing a suitable promoter such as nickel effective to promote the endothermic reaction between carbon dioxide and carbon during the catalyst regeneration. An active catalyst may be regarded as one which when a gas oil boiling in the range about 500 to 700° F. is passed in vapor form through a stationary mass of the catalyst in particle form at a temperature of about 950° F. with a liquid space velocity of about 2 for a period of about 2 hours without interruption, the yield of debutanized 400° F. end point gasoline obtained amounts to at least 10% by volume of the gas oil, the gasoline having a clear octane number of at least about 77 to 78 CFRM.

According to the foregoing description regeneration of the cracking catalyst is effected substantially entirely by treatment with carbon dioxide. However, it is contemplated that the spent catalyst may be partially or even largely regenerated by treatment with carbon dioxide and thereafter the regeneration is completed by treatment with oxygen, air or other oxygen-containing gas. The effluent gas produced during regeneration with oxygen is rich in carbon dioxide and contains only a relatively small amount of carbon monoxide. This gas may be scrubbed with sodium carbonate solution in order to recover the $CO_2$ contained therein and the recovered $CO_2$ passed to storage for use in effecting the preliminary regeneration of the spent catalyst.

An advantage not previously mentioned in regenerating with carbon dioxide is that the resulting gas may be relatively free or substantially entirely free from nitrogen. The absence of nitrogen from the resulting carbon monoxide gas is advantageous from the standpoint of avoiding unnecessary dilution of the gas passing to the synthesis reaction.

While the process as described above involves effecting catalytic cracking of the feed oil under substantially standard conditions, nevertheless it is contemplated that the cracking step may be carried out under less conventional conditions involving the employment of high temperatures with relatively short times of contact.

For example, gas oil derived from East Texas crude was vaporized, heated to a temperature of about 1200° F. and the hot vapors passed through a contact mass of Doucil impregnated with nickel at a liquid space velocity[1] of about 2. Under these conditions cracking of the oil occurred with deposition of carbon upon the catalyst.

After ceasing the flow of hydrocarbon vapor through the contact mass and purging with nitrogen for a few minutes, a stream of carbon dioxide was passed through the contact mass maintained at about 1200° F. for a period of one hour at a gas space velocity of about 115.

The effluent gas obtained during regeneration with the carbon dioxide was scrubbed with caustic soda solution to remove carbon dioxide, leaving a scrubbed gas containing about 60 to 70% carbon monoxide, the remainder being mainly nitrogen remaining in the system from the purging.

The amount of carbon removed by the carbon dioxide treatment in several different runs ranged from 38 to 60% or more by weight of the total carbon deposited on the catalyst.

By continuing the regeneration in the foregoing example for an additional period of time carbon removal would be completed. If desired the final stages of regeneration may be effected by treatment with an oxygen containing gas thereby forming additional carbon dioxide with which to replenish the supply of this gas in the tank 60.

Oxygen or other oxygen-containing gas may be introduced from a source not shown through a pipe 61 to the reactors 4 and 4'. The effluent combustion gas may be separately treated, or passed to an absorber 62 for scrubbing with soda solution, as in the case of the absorber 33, for the purpose of recovering carbon dioxide. The resulting solution is conducted through a pipe 63 and pipe 35 to the heater 55 wherein the carbon dioxide is liberated for return to the tank 60.

Obviously many modifications and variations of the invention, as hereinbefore set forth, may be made without departing from the spirit and scope thereof, and therefore only such limitations should be imposed as are indicated in the appended claims.

I claim:

1. A process for the manufacture of naphtha hydrocarbons which comprises maintaining in a reaction zone a stationary mass of cracking catalyst consisting essentially of acid-treated Doucil (Doucil being a synthetic gel having the approximate composition $Na_2O$, $Al_2O_3$, $5SiO_2$) impregnated with nickel, said catalyst being in solid granular form, passing feed oil vapors through the mass at a temperature in the range 850 to 1000° F., effecting substantial cracking of hydrocarbons into gasoline hydrocarbons and hydrogen with deposition of carbonaceous matter upon the catalyst during said passage, removing gasoline hydrocarbons and hydrogen from the cracking

---

[1] The volume of oil measured as liquid at 60° F. charged per hour per volume of catalyst.

reaction zone, periodically discontinuing the flow of hydrocarbons through the catalyst mass, during said discontinuance passing a reactivating gas consisting essentially of carbon dioxide through the catalyst mass at a temperature of about 1000 to 1300° F. and at a space velocity in the range 10 to 1000 volumes of gas per volume of catalyst per hour, continuing the gas flow for about 1 to 4 hours such that carbon dioxide reacts with carbonaceous deposits to form gas rich in carbon monoxide and to reactivate the catalyst, subsequently resuming the flow of hydrocarbons through the reactivated catalyst, reacting carbon monoxide produced during said reactivation with hydrogen removed from the cracking reaction to form synthetic hydrocarbons including gasoline, separating gasoline hydrocarbons from the synthetic product, and blending the separated gasoline with gasoline hydrocarbons produced in the cracking reaction.

2. A process for the manufacture of naphtha hydrocarbons which comprises subjecting feed hydrocarbons to contact with a solid granular cracking catalyst consisting essentially of a synthetic gel having the approximate composition $Al_2O_3$, $5SiO_2$ and impregnated with nickel, effecting said contact at a temperature in the range about 850 to 1000° F., effecting substantial cracking of hydrocarbons into gasoline hydrocarbons and hydrogen with deposition of carbonaceous matter upon the catalyst, said catalyst becoming deactivated as a result of said carbonaceous deposit, discharging gasoline hydrocarbons and hydrogen from the cracking reaction, separating hydrogen from the discharged products of reaction, discontinuing contact between feed hydrocarbons and deactivated catalyst, separately subjecting deactivated catalyst to contact with reactivating gas consisting essentially of carbon dioxide at a temperature in the range about 1000 to 1300° F. such that carbon dioxide reacts with said carbonaceous matter to form gas rich in carbon monoxide and to reactivate the catalyst, resuming contact between feed hydrocarbons and reactivated catalyst, reacting said carbon monoxide with said hydrogen to form synthetic hydrocarbons including gasoline, separating gasoline hydrocarbons from the synthetic product, and blending the separated gasoline with gasoline hydrocarbons produced in the cracking reaction.

3. A process for the manufacture of naphtha hydrocarbons which comprises subjecting feed hydrocarbons to contact with a solid granular cracking catalyst consisting essentially of a synthetic gel having the approximate composition of $Al_2O_3$, $5SiO_2$ and impregnated with nickel, effecting said contact at a temperature in the range about 850 to 1000° F., effecting substantial cracking of hydrocarbons into gasoline hydrocarbons and hydrogen with deposition of carbonaceous matter upon the catalyst, said catalyst becoming deactivated as a result of said carbonaceous deposit, discharging gasoline hydrocarbons and hydrogen from the cracking reaction, separating hydrogen from the discharged products of reaction, discontinuing contact between feed hydrocarbons and deactivated catalyst, separately subjecting deactivated catalyst to contact with reactivating gas consisting essentially of carbon dioxide at a temperature in the range about 1000 to 1300° F. such that carbon dioxide reacts with said carbonaceous matter to form gas rich in carbon monoxide and for a time sufficient to partially regenerate the catalyst, subjecting the partially regenerated catalyst to contact with oxygen such that carbon dioxide is formed to provide a supply of said reactivating gas and to effect further reactivation of the catalyst, resuming contact between feed hydrocarbons and said further reactivated catalyst, reacting said carbon monoxide with said hydrogen to form synthetic hydrocarbons including gasoline, separating gasoline hydrocarbons from the synthetic product and blending the separated gasoline with gasoline hydrocarbons produced in the cracking reaction.

WALTER F. CLAUSSEN.